(12) United States Patent  (10) Patent No.: US 6,690,622 B1
Eckberg, Sr. et al.  (45) Date of Patent: Feb. 10, 2004

(54) PORTABLE REMOTE-CONTROLLED FISH LOCATING SYSTEM

(76) Inventors: Paul A. Eckberg, Sr., 111 S. Baybrook Dr., Unit 502, Palatine, IL (US) 60067; Thomas W. Mobilia, III, 121 Elizabeth, Palatine, IL (US) 60067

( * ) Notice: Subject to any disclaimer, the term of this patent is extended or adjusted under 35 U.S.C. 154(b) by 0 days.

(21) Appl. No.: 10/176,781

(22) Filed: Jun. 24, 2002

(51) Int. Cl.[7] .................................................. H04R 1/00
(52) U.S. Cl. ........................ 367/173; 367/96; 367/165
(58) Field of Search ........................... 367/96, 111, 165, 367/173

(56) References Cited

U.S. PATENT DOCUMENTS 4,757,481 A * 7/1988 Orr et al. ...................... 367/96
4,901,291 A * 2/1990 Kurata ......................... 367/111

* cited by examiner

*Primary Examiner*—Daniel T. Pihulic

(57) ABSTRACT

A portable remote-controlled fish finding system for allowing users to scan a wide area of the body of water away from a shore, dock and boat to find fish. The portable remote-controlled fish finding system includes a sonar assembly being floatable upon a body of water; and also includes a fish display assembly being connected to the sonar assembly; and further includes a control assembly for controlling movement of the sonar assembly upon the body of water.

7 Claims, 4 Drawing Sheets

PORTABLE REMOTE-CONTROLLED FISH LOCATING SYSTEM

BACKGROUND OF THE INVENTION

1. Field of the Invention

The present invention relates to portable remote-controlled fish finders and more particularly pertains to a new portable remote-controlled fish finding system for allowing users to scan a wide area of the body of water away from a shore, dock and boat to find fish.

2. Description of the Prior Art

The use of portable remote-controlled fish finders is known in the prior art. More specifically, portable remote-controlled fish finders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,154,016; U.S. Pat. No. 4,161,077; U.S. Pat. No. 4,339,888; U.S. Pat. No. 4,888,747; U.S. Pat. No. 4,253,165; and U.S. Pat. No. Des. 262,563.

While these devices fulfill their respective, particular objectives and requirements, the aforementioned patents do not disclose a new portable remote-controlled fish finding system. The prior art includes inventions having sonar units and display monitors connected to a home base.

SUMMARY OF THE INVENTION

The general purpose of the present invention, which will be described subsequently in greater detail, is to provide a new portable remote-controlled fish finding system which has many of the advantages of the portable remote-controlled fish finders mentioned heretofore and many novel features that result in a new portable remote-controlled fish finding system which is not anticipated, rendered obvious, suggested, or even implied by any of the prior art portable remote-controlled fish finders, either alone or in any combination thereof. The present invention includes a sonar assembly being floatable upon a body of water; and also includes a fish display assembly being connected to the sonar assembly; and further includes a control assembly for controlling movement of the sonar assembly upon the body of water. None of the prior art describes a sonar unit which moves away from a home base for the purpose of locating fish in a body of water.

There has thus been outlined, rather broadly, the more important features of the portable remote-controlled fish finding system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new portable remote-controlled fish finding system which has many of the advantages of the portable remote-controlled fish finders mentioned heretofore and many novel features that result in a new portable remote-controlled fish finding system which is not anticipated, rendered obvious, suggested, or even implied by any of the prior art portable remote-controlled fish finders, either alone or in any combination thereof.

Still another object of the present invention is to provide a new portable remote-controlled fish finding system for allowing users to scan a wide area of the body of water away from a shore, dock and boat to find fish.

Still yet another object of the present invention is to provide a new portable remote-controlled fish finding system that is easy and convenient to set up and use.

Even still another object of the present invention is to provide a new portable remote-controlled fish finding system that allows the user to search for fish away from a shore, dock and boat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
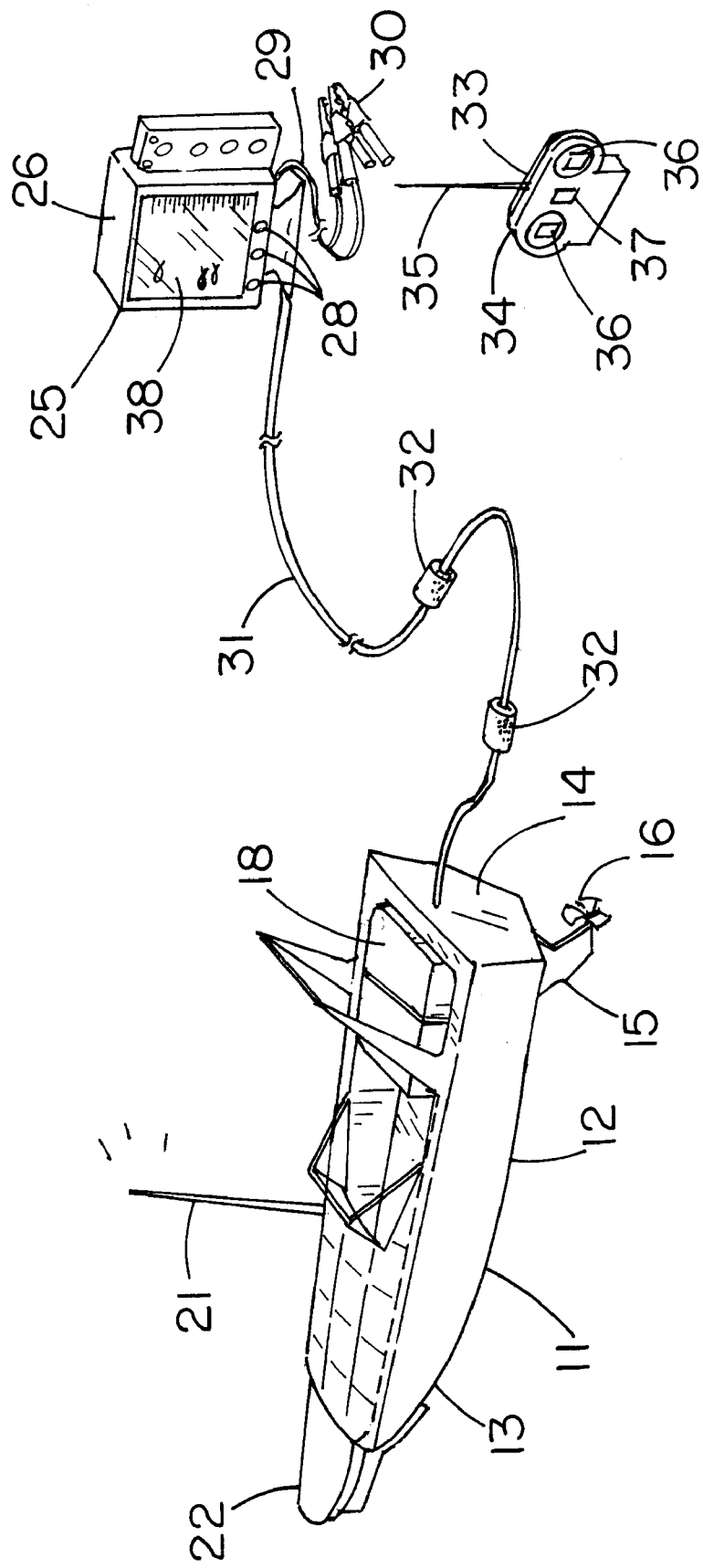
FIG. 1 is a perspective view of a new portable remote-controlled fish finding system according to the present invention.
Figure 2:
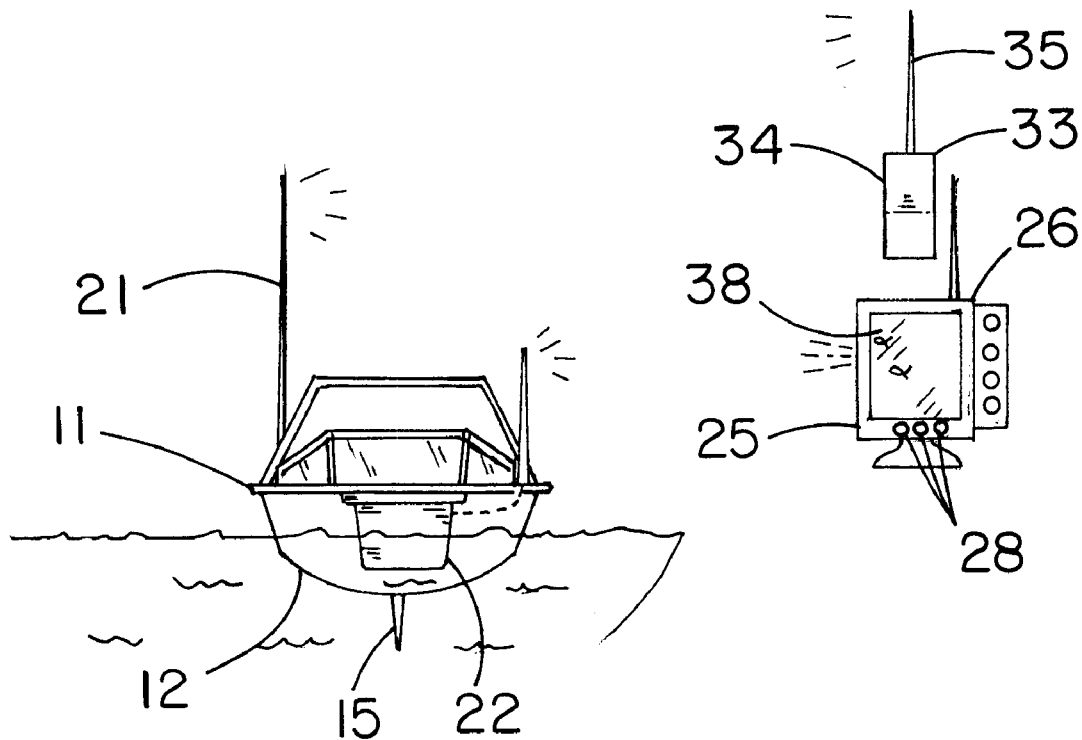
FIG. 2 is a front elevational view of the present invention shown in use.
Figure 3:
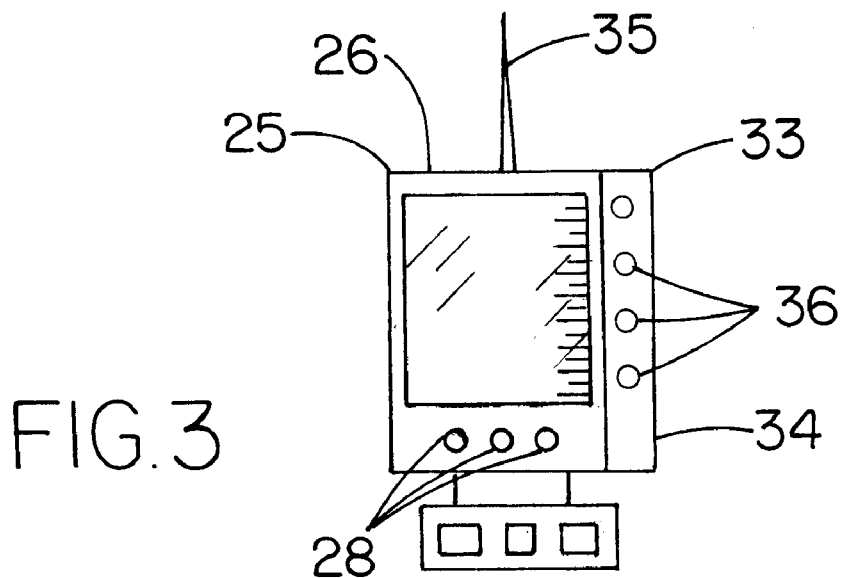
FIG. 3 is a front elevational view a second embodiment of the display unit and the control unit of the present invention.
Figure 4:
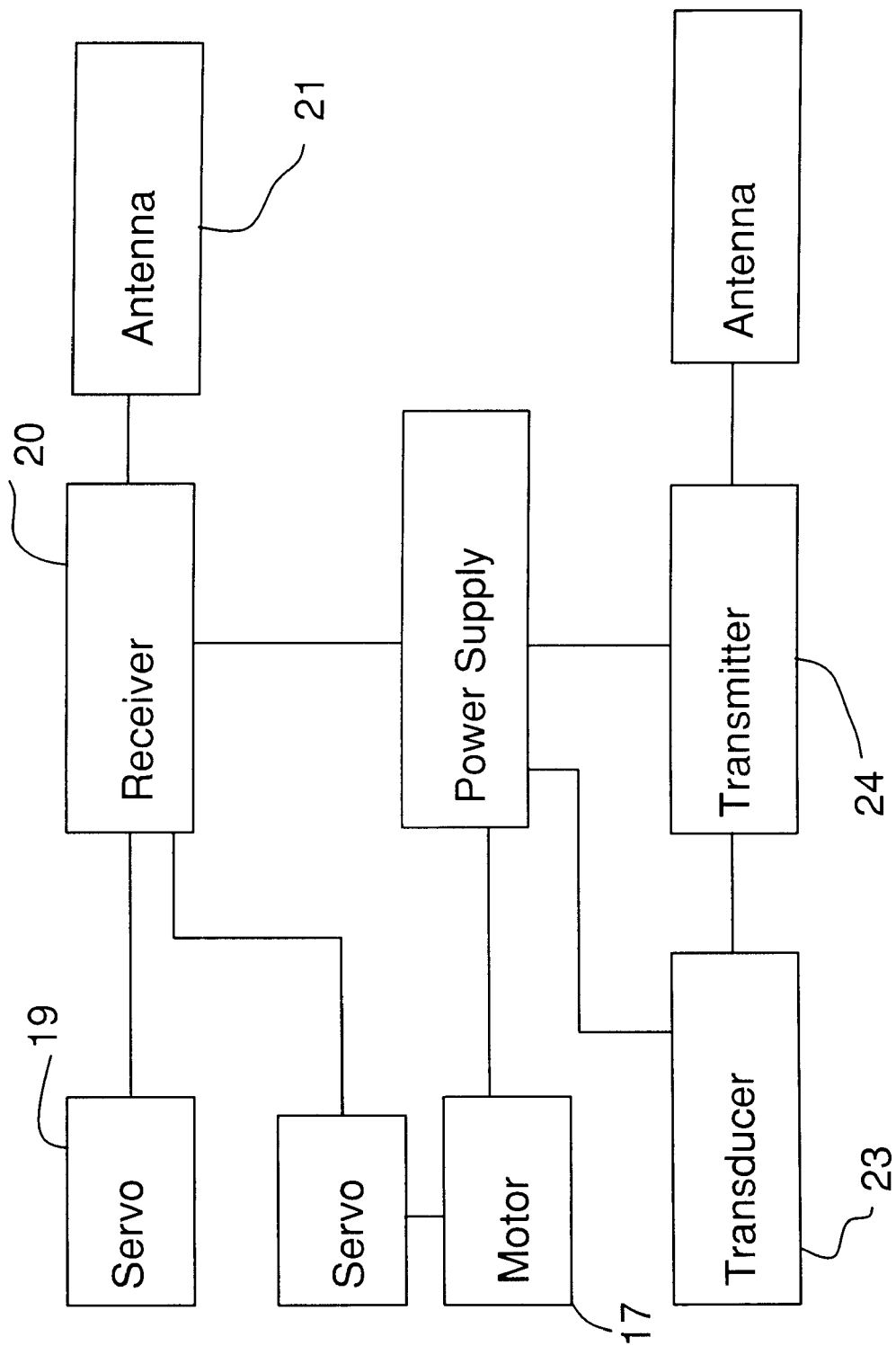
FIG. 4 is a schematic diagram of the present invention.
Figure 5:
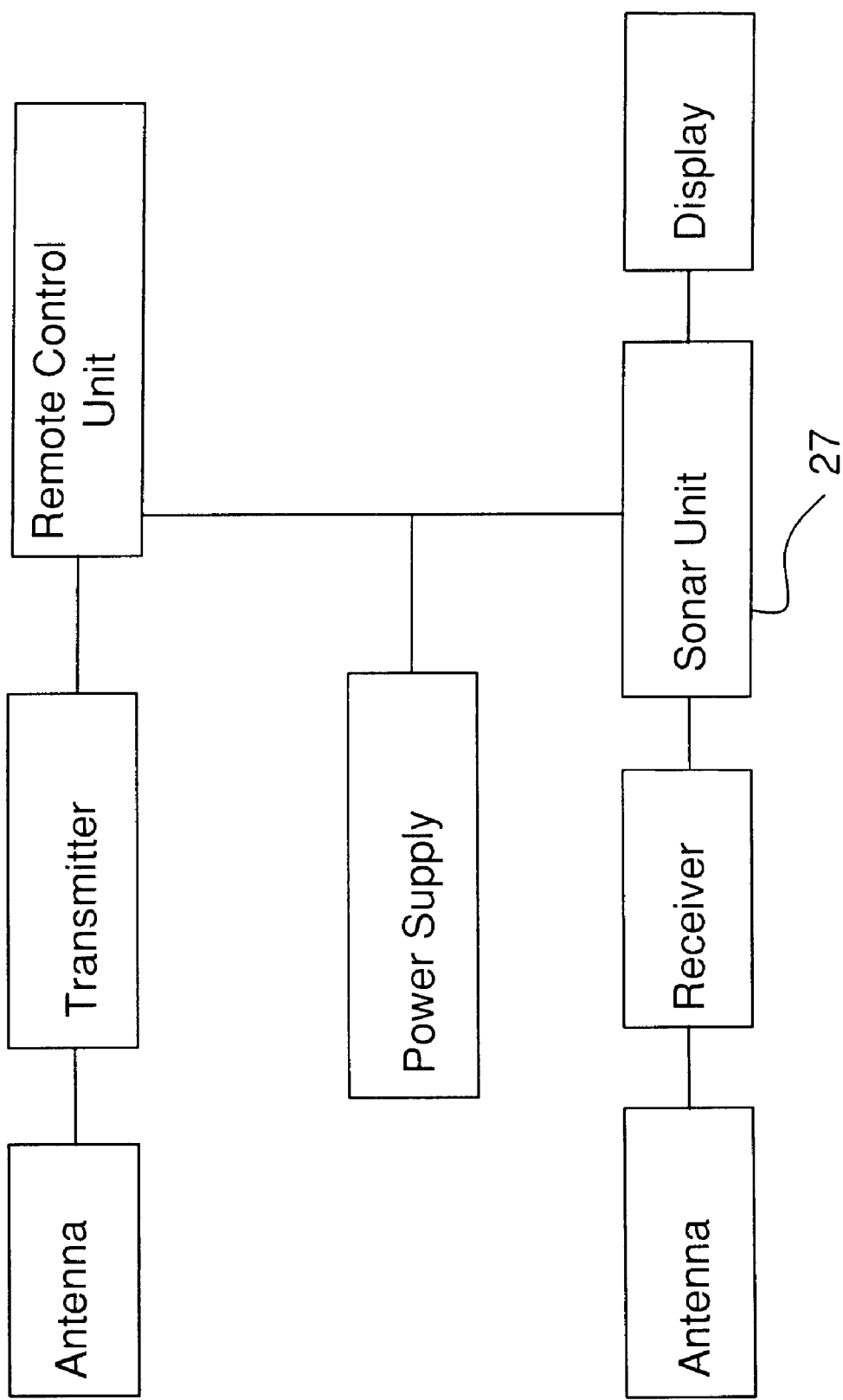
FIG. 5 is a schematic diagram the second embodiment of he present invention.

With reference now to the drawings, and in particular to FIGS. 1 through 5 thereof, a new portable remote-controlled fish finding system embodying the principles and concepts of the present invention and generally designated by the reference numeral 10 will be described.

As best illustrated in FIGS. 1 through 5, the portable remote-controlled fish finding system 10 generally comprises a sonar assembly being floatable upon a body of water. The sonar assembly includes a floatation member 11 being movable upon the body of water, and also includes a water propulsion member 15, 16 conventionally depending from a bottom wall 12 of the floatation member 11, and further includes a motor 17 being conventionally connected to the water propulsion member 15, 16 for the energizing thereof, and also includes a power supply 18 being conventionally disposed upon the floatation member 11 and being conventionally connected to the motor 17, and further includes a servo member 19 being conventionally connected to the water propulsion member 15,16, and also includes a receiver unit 20 being conventionally disposed upon the floatation member 11 and being conventionally connected to the motor 17 and to the servo member 19 for receiving transmitted radio signals and for energizing the motor 17 and the servo member 19, and also includes an antenna 21 being conventionally mounted to the floatation member 11 and being conventionally connected to the receiver unit 20, and further includes a sonar unit 22 being conventionally attached to the floatation member 11 for emitting sound waves into the body of water. The floatation member 11 is a miniaturized toy boat structure having a bow 13 and a stern 14. The water propulsion member 15,16 includes a fin member 15 conventionally depending from the bottom wall 12 at the stern 14 of the miniaturized toy boat structure 11 and being pivotally and conventionally connected to the servo member 19 for steering the miniaturized boat structure 11 upon the body of water, and also includes a propeller 16 being rotatably and conventionally attached at a free end of the fin member 15 for propelling the miniaturized toy boat structure 11 upon the body of water. The sonar unit 22 includes a transducer 23 for emitting the sound waves into the body of water, and also includes an echo-receiving transmitter 24 for sending echoes received from the transmitted sound waves.

A fish display assembly is conventionally connected to the sonar assembly. The fish display assembly includes a monitor 25 having a housing 26, and also having a display screen 38 being conventionally disposed upon the housing 26, and further having a microprocessor 27 being conventionally disposed in the housing 26 and including a radio signal converter and being conventionally connected to the display screen 38 for receiving radio signals from the sonar unit 22 and converting the radio signals for display upon the display screen 38; and also includes control switches 28 being conventionally attached to the housing 26 and being conventionally connected to the microprocessor 27 for controlling the output displayed upon the display screen 38; and further includes a power cord 29 being conventionally connected to the microprocessor 27 and having battery terminal fasteners 30 being conventionally attached to ends thereof for fastening to terminals of a battery; and also includes a transducer cable 31 being conventionally connected to the microprocessor 27 and to the sonar unit 22 for transmitting radio signals from the sonar unit 22 to the microprocessor 27; and further includes floater members 32 being conventionally disposed about the transducer cable 31 so that the transducer cable 31 can float upon the body of water. The battery terminal fasteners 30 are alligator clips. The transducer cable 31 has a length of approximately 110 feet. The display screen 38 is a LCD readout display screen showing the echoes of the sound waves transmitted by the sonar unit 22.

A control assembly for controlling movement of the sonar assembly upon the body of water includes a housing member 33, and also includes a radio transmitter 34 being conventionally disposed in the housing member 33; and further includes an antenna member 35 being conventionally attached to the housing member 33 for sending radio signals to the receiver unit 20; and also includes switch members 36 being movably and conventionally disposed upon the housing member 33 for controlling the radio signals being sent from the radio transmitter 34 to the receiver unit 20 and for controlling movement of the floatation member 11; and further includes a power supply 37 being conventionally connected to the switch members 36 and to the radio transmitter 34 with the potable remote-controlled fish finding system 10 being portable and able to be carried and taken along by a user.

In use, the user places the floatation member 11 in the body of water, and uses the radio transmitter 34 and the switch members 36 to move the floatation member 11 upon the body of water and up to 110 feet away from a shore, a dock, or one's boat with the sonar unit 22 sending out radio waves into the body of water and the echo-receiving transmitter 24 sending the echoes to the microprocessor 27; whereupon, the images such as fish located in the body of water is displayed upon the display screen 38 for the user to see.

We claim:

1. A portable remote-controlled fish finding system comprising:

a sonar assembly being floatable upon a body of water, said sonar assembly including a floatation member being movable upon the body of water, and also including a water propulsion member depending from a bottom wall of said floatation member, and further including a motor being connected to said water propulsion member for the energizing thereof, and also including a power supply being disposed upon said floatation member and being connected to said motor, and further including a servo member being connected to said water propulsion member, and also including a receiver unit being disposed upon said floatation member and being connected to said motor and to said servo member for receiving transmitted signals and for energizing said motor and said servo member, and also including an antenna being mounted to said floatation member and being connected to said receiver unit, and further including a sonar unit being attached to said floatation member for emitting sound waves into the body of water, said floatation member being a miniaturized toy boat structure having a bow and a stern, said water propulsion member including a fin member depending from said bottom wall at said stern of said miniaturized toy boat structure and being pivotally connected to said servo member for steering said miniaturized boat structure upon the body of water, and also including a propeller being rotatably attached at a free end of said fin member for propelling said miniaturized toy boat structure upon the body of water;

a fish display assembly being connected to said sonar assembly; and a control assembly for controlling movement of said sonar assembly upon the body of water.

2. A portable remote-controlled fish finding system as described in claim 1, wherein said sonar unit includes a transducer for emitting the sound waves into the body of water, and also includes a echo-receiving transmitter for sending echoes received from the transmitted sound waves.

3. A portable remote-controlled fish finding system as described in claim 2, wherein said fish display assembly includes a monitor having a housing, and also having a display screen being disposed upon said housing, and further having a microprocessor disposed in said housing and including a radio signal converter and being connected to said display screen for receiving radio signals from said sonar unit and converting the radio signals for display upon said display screen; and also includes control switches being attached to said housing and being connected to said microprocessor for controlling the output displayed upon the display screen; and further includes a power cord being connected to said microprocessor and having battery terminal fasteners attached to ends thereof for fastening to terminals of a battery; and also includes a transducer cable being connected to said microprocessor and to said sonnar unit for transmitting radio signals from said sonar unit to said microprocessor; and further includes floater members being disposed about said transducer cable so that said transducer cable can float upon the body of water.

4. A portable remote-controlled fish finding system as described in claim 3, wherein said battery terminal fasteners are alligator clips.

5. A portable remote-controlled fish finding system as described in claim 4, wherein said transducer cable has a length of approximately 110 feet.

6. A portable remote-controlled fish finding system as described in claim 3, wherein said control assembly includes a housing member, and also includes a radio transmitter being disposed in said housing member; and further includes an antenna member being attached to said housing member for sending radio signals to said receiver unit; and also includes switch members being movably disposed upon said housing member for controlling the radio signals being sent from said radio transmitter to said receiver unit and for controlling movement of said floatation member; and further includes a power supply being connected to said switch members and to said radio transmitter with said potable remote-controlled fish finding system being portable and able to be carried and taken along by a user.

7. A portable remote-controlled fish finding system as described in claim 3, wherein said display screen is a LCD readout display screen showing the echoes of the sound waves transmitted by said sonar unit.

* * * * *